United States Patent
Aylward et al.

(10) Patent No.: US 6,808,291 B1
(45) Date of Patent: Oct. 26, 2004

(54) SAFETY/WARNING DEVICE

(75) Inventors: David R. Aylward, Melbourne (AU); William Samuel Hunter, Ascot Vale (AU); Daphne Flynn, Bukit Damansara (AU); Graeme Bullock, Mount Waverley (AU)

(73) Assignee: Elfare Corporation Pty Ltd., Victoria (AU)

( * ) Notice: Subject to any disclaimer, the term of this patent is extended or adjusted under 35 U.S.C. 154(b) by 0 days.

(21) Appl. No.: 08/737,493

(22) Filed: Feb. 5, 1997

Related U.S. Application Data

(63) Continuation-in-part of application No. PCT/AU95/00289, filed on May 18, 1995.

(30) Foreign Application Priority Data

May 18, 1994 (AU) .............................................. PM5723
Dec. 29, 1995 (AU) .............................................. PM7364

(51) Int. Cl.[7] .............................. F21L 4/04; F21V 21/20
(52) U.S. Cl. ...................... 362/205; 362/186; 362/336; 362/401; 362/399
(58) Field of Search ................................ 362/186, 191, 362/202, 205, 401, 457, 336, 396, 399

(56) References Cited

U.S. PATENT DOCUMENTS

| 1,562,994 A | 11/1925 | Stewart |
| D235,797 S | 7/1975 | Friedberg |
| 4,117,455 A * | 9/1978 | Cervantes .................... 40/608 |
| 4,428,034 A * | 1/1984 | Seller ......................... 362/186 |
| 4,447,802 A | 5/1984 | Bose |
| D274,317 S | 6/1984 | Nelson |
| 4,453,204 A | 6/1984 | Warshawsky |
| D276,658 S | 12/1984 | Yuen |
| 4,586,741 A | 5/1986 | Muti |
| 4,739,302 A * | 4/1988 | Kinard ......................... 40/608 |
| 4,827,389 A | 5/1989 | Crum |
| 5,036,447 A | 7/1991 | Taylor |
| D318,817 S | 8/1991 | Sinrod |
| 5,122,781 A | 6/1992 | Saubolle |
| 5,160,201 A | 11/1992 | Wrobel |
| 5,163,752 A | 11/1992 | Copeland et al. |
| 5,230,560 A | 7/1993 | Lyons |

(List continued on next page.)

FOREIGN PATENT DOCUMENTS

| AU | 20807 | 12/1924 |
| AU | 278448 | 3/1965 |
| AU | 20561/92 | 2/1993 |
| DE | 839916 | 5/1952 |
| DE | 1 489 362 | 3/1969 |
| DE | 42 11 948 | 10/1993 |
| DE | 42 11 953 | 10/1993 |
| EP | 0 528 588 | 2/1993 |
| FR | 2514468 | 4/1983 |
| GB | 1 603 824 | 12/1981 |
| GB | 2 238 107 | 5/1991 |

Primary Examiner—Y. My Quach-Lee
Assistant Examiner—Peggy A Neils
(74) Attorney, Agent, or Firm—Merchant & Gould P.C.

(57) ABSTRACT

A hazard/safety warning device is disclosed which has a lamp member and a base, the lamp member being able to be used with and without the base. The base has a self-righting feature so that when the lamp is in the base, the lamp will rock to the vertical position. The lamp is activated by rotating a fresnel lens about its longitudinal axis relative to the body. A bonnet connection allows the lamp member to be attached to the base. The base is external ribs for stability of operation, and the body of the lamp has at least two handles. The filament of the globe is located at the optical centre of lens, with the lens being designed to have a generally vertical directed beam along the longitudinal axis, and an annular, transverse beam generally horizontal. The remainder of the lens provides a diffused light.

15 Claims, 15 Drawing Sheets

U.S. PATENT DOCUMENTS

| | | | | |
|---|---|---|---|---|
| 5,278,735 A | * | 1/1994 | Her | 362/397 |
| 5,335,157 A | * | 8/1994 | Lyons | 362/297 |
| D352,915 S | | 11/1994 | Wang | |
| 5,490,051 A | * | 2/1996 | Messana | 362/401 |
| 5,510,963 A | * | 4/1996 | Bamber et al. | 362/396 |
| 5,590,956 A | * | 1/1997 | Messana et al. | 362/401 |
| D389,595 S | | 1/1998 | Hunter | |
| D402,383 S | | 12/1998 | Hunter | |
| D412,132 S | | 7/1999 | Aylward et al. | |
| 6,045,236 A | | 4/2000 | Cheng et al. | |
| 6,074,072 A | | 6/2000 | Parsons et al. | |
| 6,086,220 A | | 7/2000 | Lash et al. | |
| 6,099,148 A | | 8/2000 | Northrup et al. | |
| 6,511,203 B1 | | 1/2003 | Winther | |
| 2001/0012204 A1 | | 8/2001 | Sharrah et al. | |
| 2002/0114154 A1 | | 8/2002 | Galli | |

* cited by examiner

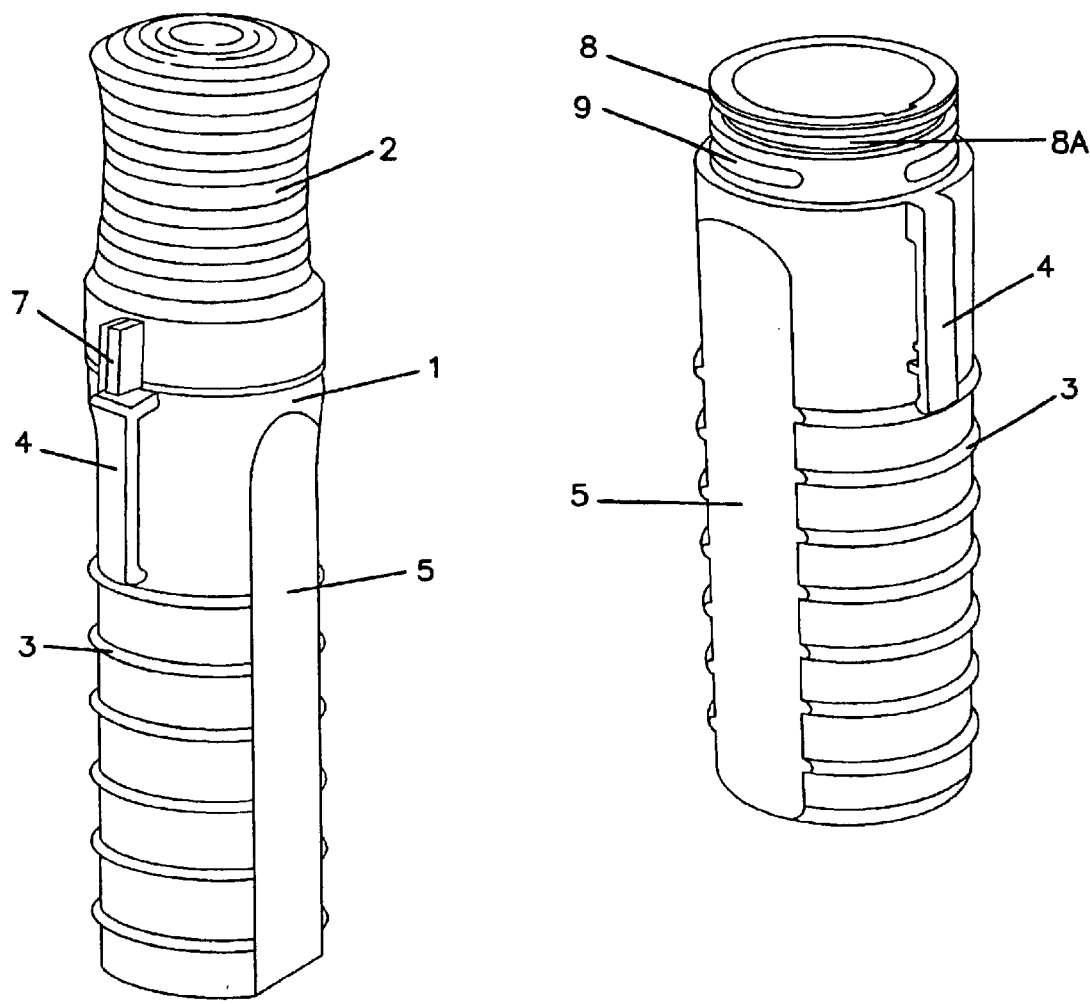

FIG. 14
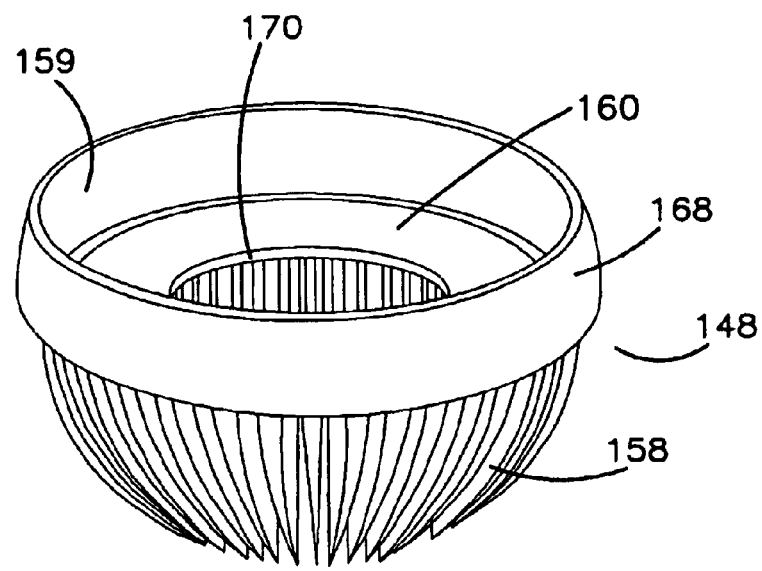
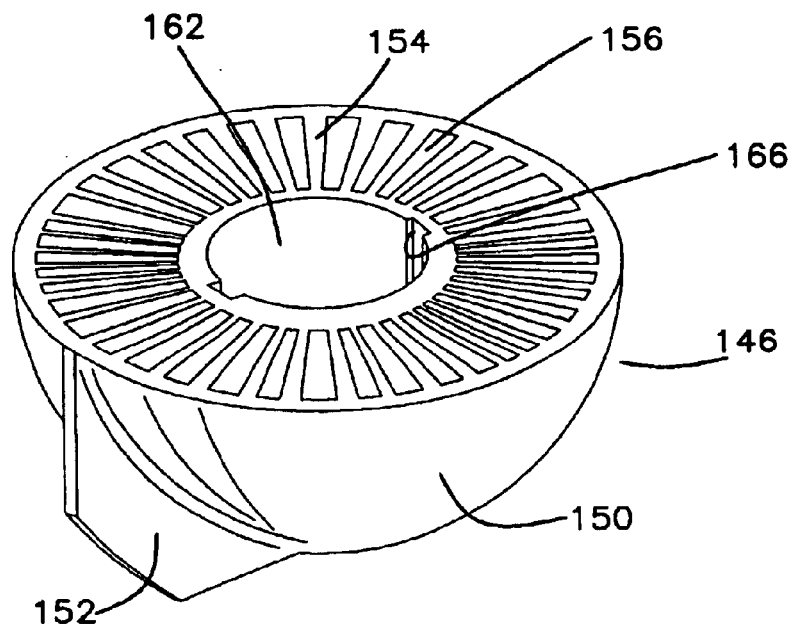

FIG. 15
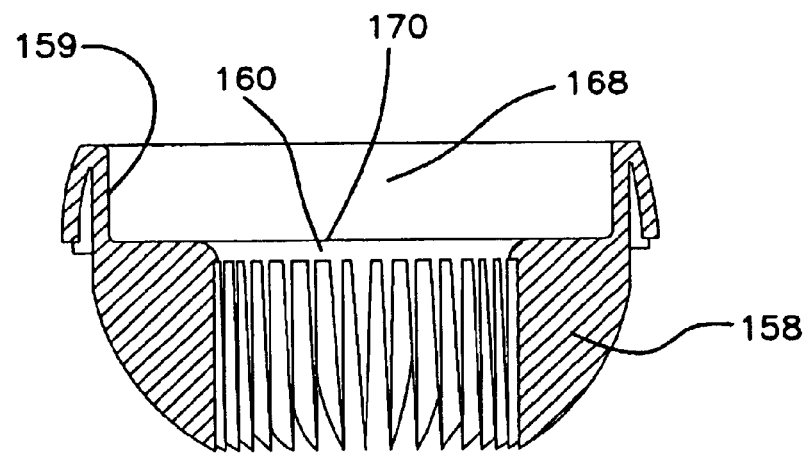
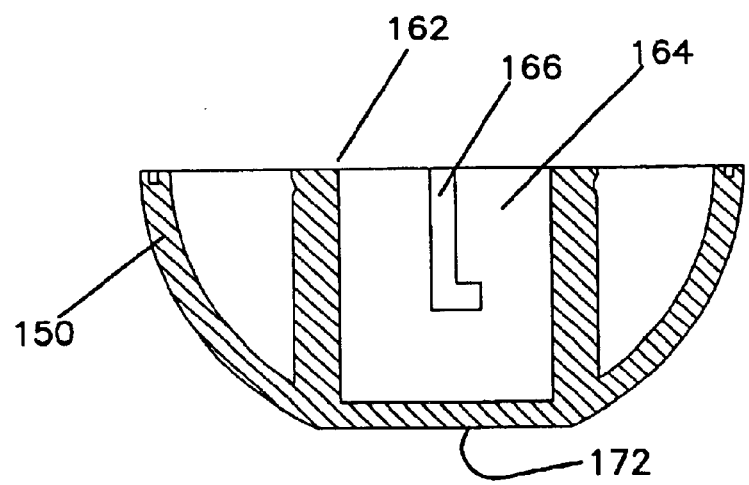

SAFETY/WARNING DEVICE

This is a continuation-in-part application of International Application PCT/AU95/00289, with international filing date May 18, 1995, now abandoned.

FIELD OF THE INVENTION

This invention relates to a hazard/safety warning device for indicating the presence of a hazard and/or the location of a person or object, particularly, though not exclusively, in abnormal situations.

BACKGROUND OF THE INVENTION

Hazard/safety warning devices are used in a multitude of applications to indicate the location of a hazard such as a toxic or an inflammable spillage on a roadway; to warn drivers of a disabled vehicle on a roadway; to warn of a fires hazard; to illuminate a desired path such as an airport runway (particularly in remote areas); the indication of a safe landing zone for medical and/or emergency evacuation helicopters; to indicate the location of people or objects in situations of reduced visibility, and other similar uses.

A commonly used hazard/safety warning device is a pyrotechnic flare. These flares glow very brightly but have numerous disadvantages. Some of these disadvantages include their very short operational life following ignition, and their comparatively short shelf life. They are also hazardous to use in certain situations such as in or near combustible materials, or in or near woods or parklands, where the risk of accidental fires is always present. They can also harm a user or other persons due to their high temperatures, sparks, and toxic and/or noxious fumes given off when burning. Other disadvantages of such devices include their susceptibility to damp, their comparative ineffectiveness in very wet conditions, their need to be held or supported by a user in order to be effective, the time and personnel required to ignite them and place them in position, and the fact that once ignited they can be used only once. They can also be difficult to extinguish if it becomes desirable to do so.

U.S. Pat. No. 1,562,994 discloses a form of lamp similar to the many varied and well-known bed lamps. It has a clamp adapted to be secured to a device such as a bedhead, as well as a short arm with pivotal connections at each end. It is not portable nor capable of resting on a surface. Furthermore, the lamp portion is not separable from the base and capable of independent operation.

Another commonly used hazard/warning device is known in U.S. Pat. No. 4,447,802. This shows a flashing orange light located within a metallic or plastic housing such as has been used by local councils and road repairers for many years. These are relatively bulky, heavy, and expensive. Because of their weight and bulk, these devices are not suitable to be carried by a user as a safety location device. They are also intended to be stood on a flat base and are, therefore, quite easily knocked over, which reduces their effectiveness (particularly on uneven terrain). They are also designed to have new or recharged batteries replaced upon discharge of the current batteries. As a consequence, there is an element of ongoing maintenance in their use, along with an element of unreliability due to connection defects between the battery terminals and the conductors supplying the lamp device.

Non-illuminating devices are also often used as hazard/safety warning devices. Such devices include reflective strips, reflective triangles and the like. These devices are adapted to reflect incident light such as that emitted from the headlight of a vehicle. The usefulness of such devices at night in the absence of any illuminating light is minimal.

U.S. Pat. No. 4,453,204 shows a holder for a lamp and has a base, an elongate body, and claims to enable the assembly to be attached to an arm of an elective lamp supplied from a normal power supply. The arrangement is more to hold a conventional lamp above a table rather than a hazard/safety warning device. The base is not adapted for pivotal movement, nor is the lamp capable of separate, independent operation.

U.S. Pat. No. 4,586,741 shows a holder for torches or flashlights and which has an elongate body, and an illumination means located at one end of the elongate body. It is intended for holding a flashlight down a manhole and could not be used for the purposes of the present invention.

The disclosure of U.S. Pat. No. 4,827,389 is directed to a portable light for night fishing from a boat or from the shore. It is not useable as a hazard/safety warning device and has no self-righting feature. The light cannot be operated independently of the base.

U.S. Pat. No. 5,036,447 relates to a stick for supporting an outdoor lighting fixtures. It uses as an exposed bulb and electrical wires which are adapted to pass through the stick but still allow for connection to the light bulb. It is not directed towards the same object of the present invention. It has no self-righting feature, and the light cannot be operated independently of the stick.

A panel illuminating module is disclosed in U.S. Pat. No. 5,160,201 and which has an upper part with several light emitting diodes and a lower part which fits into a standard panel circuit. The two are joined by a bayonet fitting. It is not a hazard/safety warning light, and the light cannot be used separately from the base. There is no self-righting feature.

U.S. Pat. No. 5,122,781 to Saubolle discloses a hazard warning device incorporating a stemlike body having a strut assembly similar to an umbrella frame which is able to be deployed between a folded condition and a deployed condition in which the struts form a tripod support for the device. Mounted on top of the stem-like body is a lens containing a light emitting diode. This device overcomes many of the above problems in relation to pyrotechnic flares in that it does not operate by means of combustion. Both the shelf life and the operational life of such a device are also greater than those of pyrotechnic flares. However, this device does have several limitations. The device is supported by the tripod which needs to be deployed by moving the struts from the folded condition to the deployed condition and carefully placed on the ground so that it stands upright. This can be time-consuming, especially where a large number of the devices need to be laid out. There is nothing enabling the device to re-orientate itself in the upright position if it tips over whilst is being placed in position. In conditions of high wind or running water, there is nothing to enable the device to be secured in position, nor is the device sealed which limits its useability in abnormal situations.

U.S. Pat. No. 5,163,752 has a G-clamp at one end of an elongate, flexible body, there being a torch-receiving platform at the other end of the body. There is no rigidity in the body nor is the device capable of anything other than attachment to a bench or the like. The torch/flashlight is not integral with the body.

A distress signal lamp is shown in U.S. Pat. No. 5,278,735. The lamp has a rather flat base with suction cups thereon to enable the lamp to be releasably attached to a surface of a vehicle from within the vehicle, and a clamp to enable attachment to the top of a vehicle window. Its casing is releasably attached to the base, with the casing having upper and lower sections. To the upper section is attached a lamp bead by means of a toggle joint. The nature of the base is vastly different to that of the present invention, and the product is directed to a different object.

Another safety device may be found in GP Patent 2,238,107 which relates to a safety light for attachment to a rail of a waste skip. It is a hazard/safety warning device but it does not have an elongate body. It has an engagement means on an end of the body distant from the illumination means and being adapted to releasingly engage a supportive means for supporting the device in a desired position.

GP Patent 1,603,824 relates to a self-righting hazard warning device used on roadways, as obstruction markers, or the like. It has a body. An illumination device is located at the other end of the body. The illumination means is a light source located within a fresnal lens but it is not intended the parts can be separated and used independently.

Australian Patent 20561/92 relates to a light which is pivotally mounted on a spike which is able to be placed into the ground. It does not approach the objects of the present invention.

Australian Patent 278448 is somewhat similar to the GB Patent 1603824 described above. It has a body and an illumination means at one end of the body. However, the supporting means is the body and, thus, that this product does not approach the objects of the present invention.

Australian Patent 20807/24 is for one of the first of the electric miner's lamps. It has a body which is not elongate. It has an illumination means at one end of the body, and engagement means on the body, but not necessary distant from the illumination means, and which are adapted to releasably engage the supporting means (strap) for supporting the device in a desired orientation.

European Patent 528,588 is directed to a lamp having a stake which is able to be driven into the ground and having a lamp assembly at the top. The invention defined is in relation to the way in which the electrical contact with the lamp assembly is made.

French Patent 2,514,468 shows a lamp, and a body. There is an illumination means within the body. The body is adapted to received in a socket in its lower surface an engagement means which is adapted to releasingly engage the ground by means of a spike so as to support the body in a desired position.

German Patents 4,211,953 and 4,211,948 shows a lamp having a flat base, with a conical body, battery, an elongated shaft, and a connector at the upper end of that shaft. Above the conical body is the illumination means, which is adapted to receive over it a mating lens assembly.

German Patent 1,489,362 is a bed lamp with a spring clip, an elongate shaft, an illumination means at one end of the elongate shaft, an engagement means on the shaft (but which appears to be moveable along the shaft), and adapted to releasing the engaged supporting means for supporting the device in its desired orientation.

German Patent 839916 relates to a stick for insertion in the ground of which contains a vertical array for a warning light. Again, the light cannot be used separate to the base, and it does not have any fittings which enable to achieve or even be directed towards the objects of the present invention.

German Patent 370461 is directed to a lamp with a spring base. The base is able to be attached to a horizontal or vertical surface. The main lamp is able to be pivotally moved over a limited range of movement. It is a conventional form of light fitting with a hemispherical reflector of the well-known bed lamp style. Again, it is not directed towards the objects of the present invention, cannot meet the objects of the present invention, and cannot be operated by a remote power source.

In the light of the abovementioned limitations in the devices known in the prior art, the present invention is directed towards providing a hazard/safety warning device which is suitable for use in a wide range of hazard/safety situations. The invention is also directed towards providing a hazard/warning device which is easy to use.

SUMMARY OF THE INVENTION

According to the present invention there is provide a hazard/safety warning device including:

a lamp member having an elongate body;

illumination means located at one end of the elongate body; and engagement means on the body, distant from the illumination means, adapted to securely yet releasingly engage centrally located recess in a supporting means for supporting the device in a desired orientation;

the supporting means including substantially hemispherical base which can be located on a surface to be substantially self-righting so as to maintain the warning device upright;

the lamp member being capable of operation independently of the supporting means.

The recess preferably snuggly receives an end of the elongated body of the warning device. Preferably, the snug fit will be sufficiently firm to inhibit the warning device from disengaging from the base body except with substantial force by a user. Advantageously, a bayonet fitting is used. In this case the walls of the substantially vertical recess are cylindrical and may include at least one L-shaped keyway. The body may have at least one radially extending lug adapted to co-operate with the keyway.

Alternatively, the supporting means may be a spiked member having a pointed end adapted for insertion into the ground and a distant end which includes the corresponding engagement means for engaging with the elongated body of the warning device. The corresponding engagement means may be a collar member dimensioned to snuggly receive an end of the elongated body.

The supporting means may alternatively be a strap for securing the warning device to a body or a person. In this case, the engagement means on the warning device may be two arms on opposed sides of the elongated body which extend substantially parallel with the axis of the elongated body. Preferably, these arms may be biased to press against the respective sides of the elongated body in order to grip the strap securely.

In a further preferred aspect of this invention, the illumination means includes a globe or at least one light emitting diode located within a fresnel lens. The lens may be substantially cylindrical. The side of the lens have circular grooves and ridges which extend about the lens. In a preferred aspect, the top of the lens may have coaxial circular grooves and ridges located thereon.

The lens may be dyed orange, red, blue, green or any other colour to make it appropriate for its designated purpose. The light source may incorporate a standard krypton filled filament lamp, or one or more light emitting diodes.

The illumination means may be operable by any suitable mechanism such as a switch. In one aspect of the invention, the illumination means is activated by rotating the fresnel lens about its axis bringing the electrical contacts, necessary to complete an electrical circuit with batteries held within the elongated body, into contact. In an alternative switching system, the contacts may be enclosed in an inert atmosphere and operated by a permanent magnet device such as, for example, a reed switch operated by the magnet.

In this aspect of the invention, the warning device may further include a tab located, for instance, on the side of the body, which is adapted to snap off when the fresnel lens is rotated for the first time, thereby indicating to a user whether the device is new or has been used or otherwise tampered with. The body, where it attaches to the lens, may include a sealing device such as, for example, an O-ring, so that there is a seal between the body and the lens, but the lens is free to move relative to the body about the longitudinal axis but can still remain safe to use. There may also be provided a locating ridge or further seal radially inwardly extending from the lens and adapted to co-operate with a recess in the body so as to axially locate the lens relative to the body.

The illumination means is preferably mounted on a circuit board, which includes the necessary switch contacts and/or battery contacts, as well as the circuitry required to control the flash rate of the illumination means. The flash rate of the illumination means is preferably in the range 0.8–2.2 Hz, more preferably 1.0–2.0 Hz, advantageously 1.2 Hz. The flash duration may be any suitable time such as, for example, 0.2 seconds.

The supporting means may have an outer member which has a substantially hemispherical outer wall, and an upper wall with a plurality of radially-directed, cut-outs therein to receive therethrough corresponding downwardly projecting fins from an upper surface of an inner member. Preferably, the inner member has a peripheral skirt sized and located to co-operate with the outer wall of the outer member.

BRIEF DESCRIPTION OF THE DRAWINGS

The invention will now be described with reference to the attached drawings in which:

FIG. 1 is a perspective view of a first embodiment of a hazard/safety warning device according to this invention;

FIG. 2 is a perspective view of the device of FIG. 1 with the illumination means removed;

FIG. 14 is an exploded perspective view of the base;

FIG. 15 is a vertical cross-sectional view of the base of FIG. 14;

DESCRIPTION OF PREFERRED EMBODIMENTS

Figure 3:
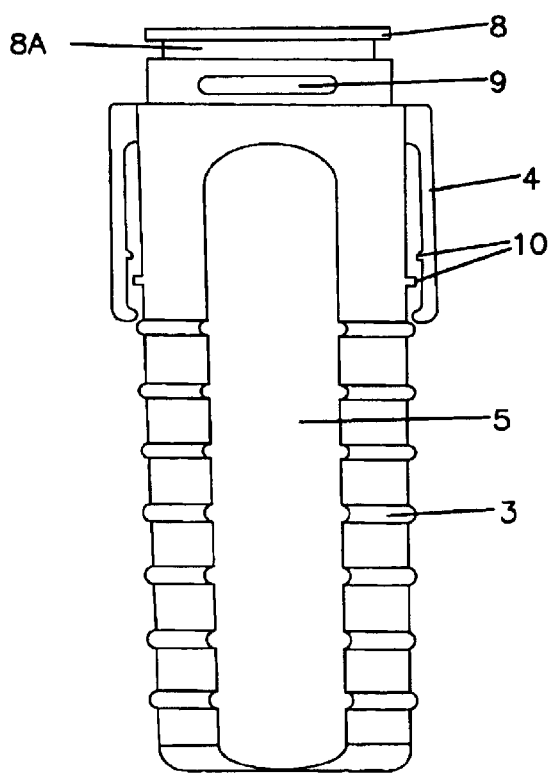
FIG. 3 is a side view of the portion of the device shown in FIG. 2.

The device illustrated in FIG. 1 includes an elongated body 1, a fresnel lens 2 and a series of substantially parallel, longitudinally displaced ribs 3 on the elongated body 1. The elongated body 1 has side-arms 4 on opposite sides thereof. The elongated body 1 is of substantially circular or oval cross-section although it includes longitudinally extending flat surfaces 5 on opposite sides thereof, which are located at approximately 90° from the side-arms 4. These flat surfaces 5 are adapted to contain written information and/or markings for a user to record the number of hours which the device has been operated (in order to provide an indication of the remaining battery life). The elongated body 1 has a generally flat base 6. The elongated body 1 also has a tab 7 located immediately beneath the fresnel lens 2 which is designed to snap off when the device is operated for the first time by rotating the lens 2 in order to complete the electrical circuit. When the tab 7 has been snapped off, a user will be able to recognise that the device has previously been used or tampered with.

FIGS. 2 and 3 show the elongated body 1 detached from the fresnel lens 2. At the top end of the elongated body 1 is a connecting means 8 for connecting the elongated body 1 to the fresnel lens 2. Beneath the connecting means 8 is an annular recess 8A for receiving an O-ring. The top of the elongated body 1 is circular to enable the fresnel lens 2 to partly rotate about it. Adjacent the top of the elongated body 1 are radially displaced slots 9 for receiving corresponding projections on an international surface of the fresnel lens adapted to guide and limit rotational movement of the fresnel lens 2 relative to the elongated body 1.

Figure 10:
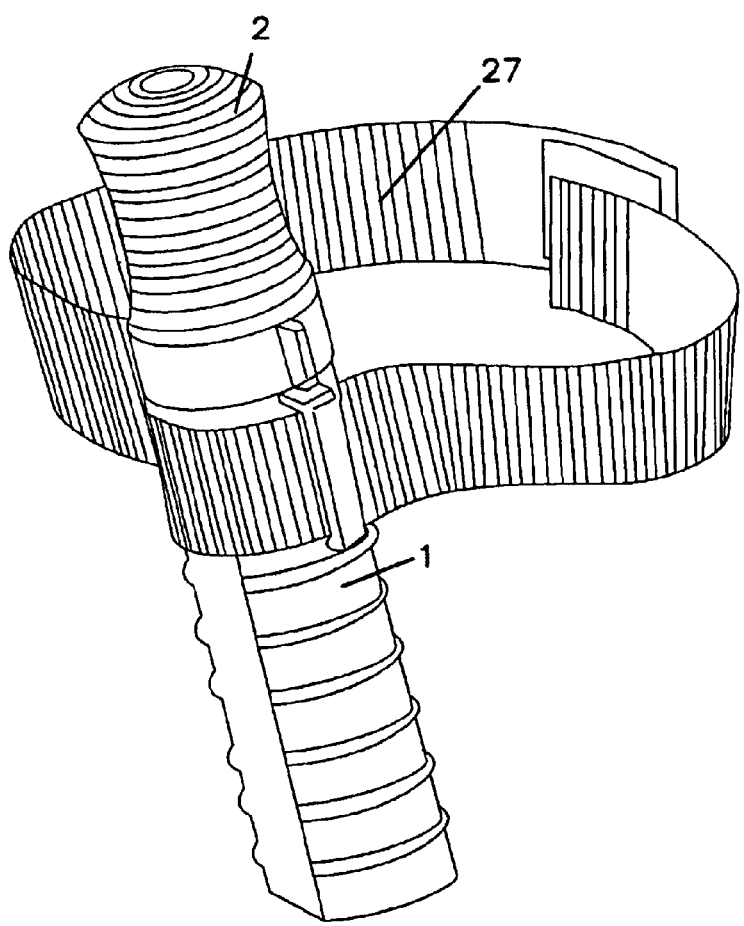
FIG. 10 is a perspective view of the device of FIG. 1 shown in engagement with a strap.
Figure 11:
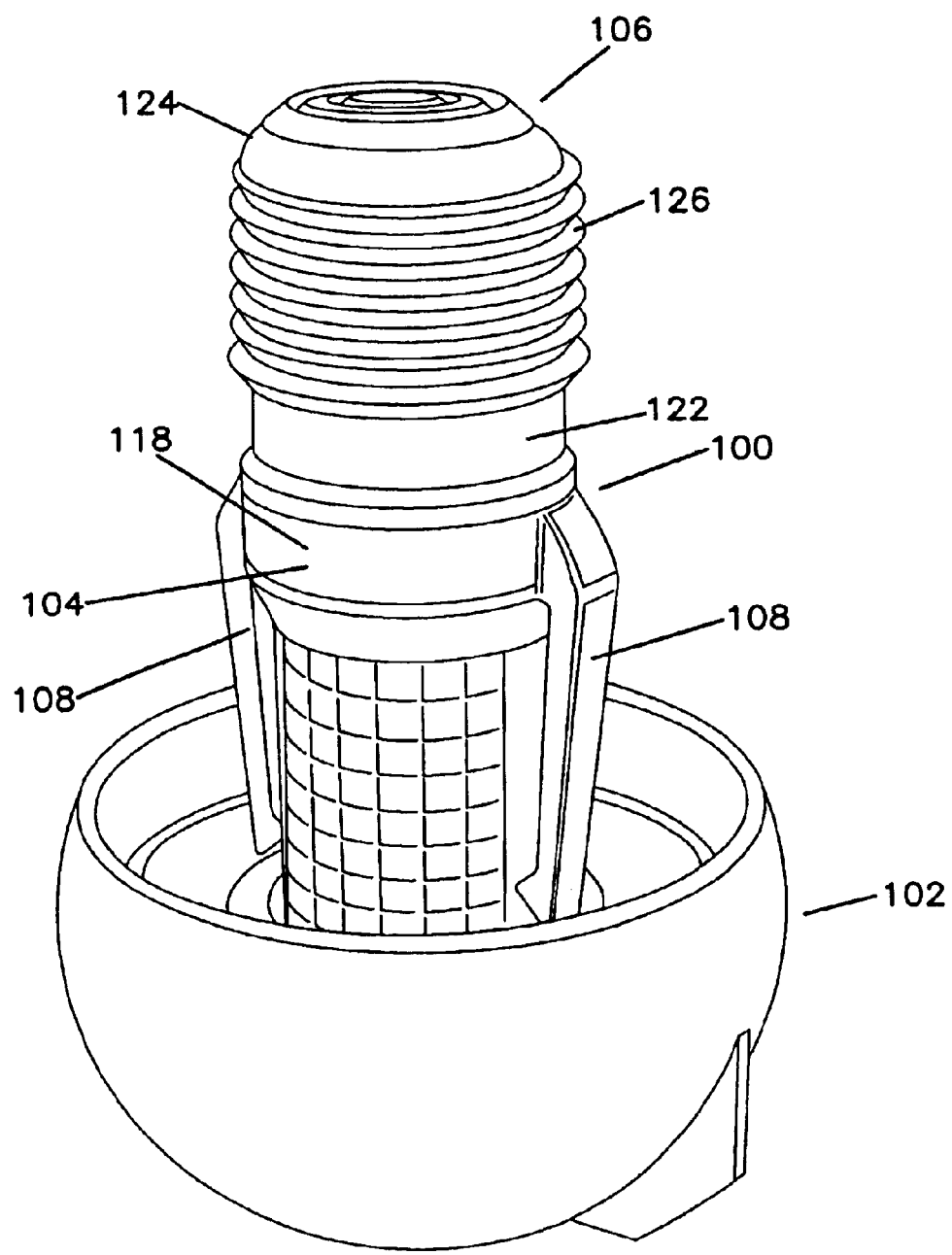
FIG. 11 is a perspective view of a second embodiment of a hazard/safety warning device according to this invention.
Figure 12:
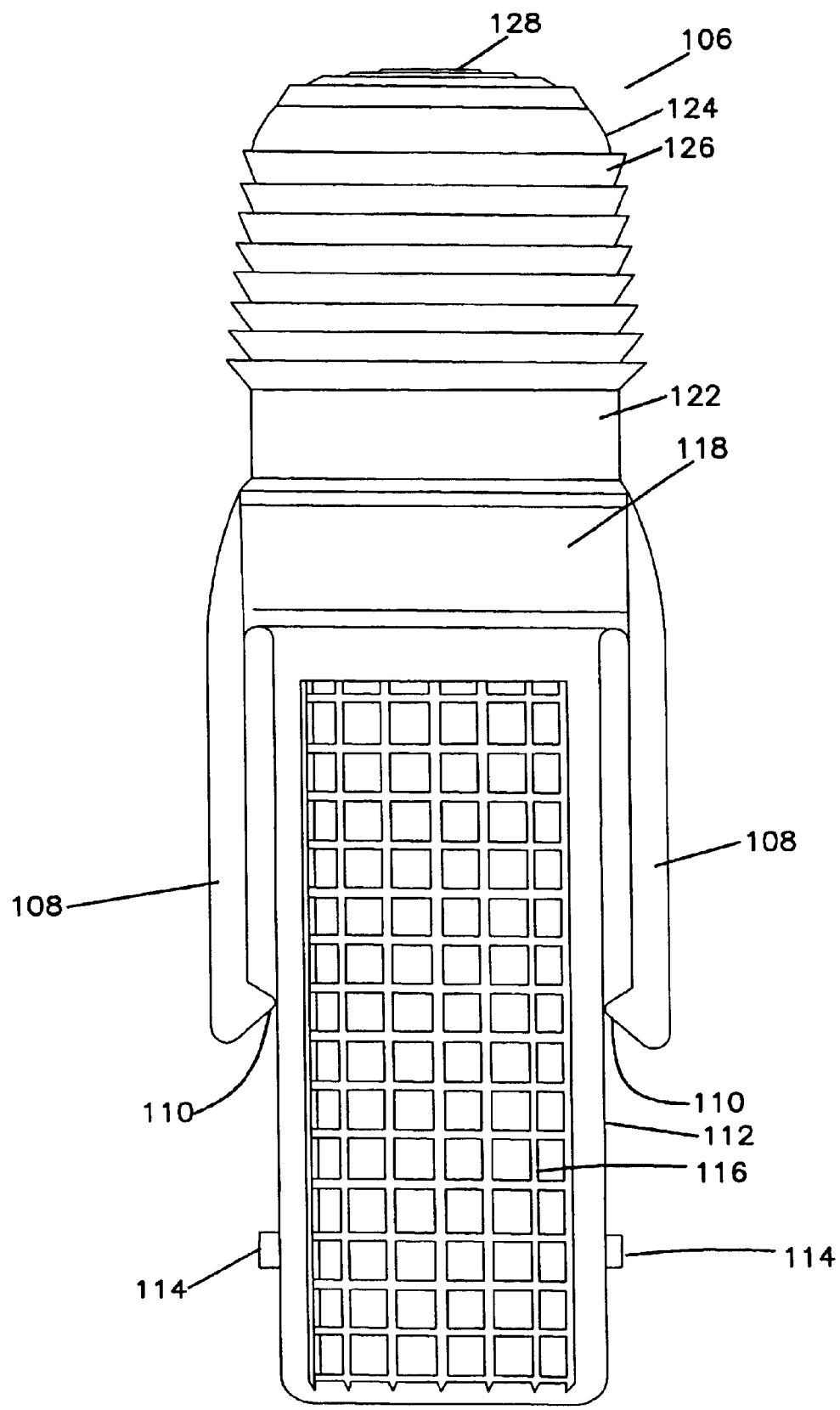
FIG. 12 is a side view of the illumination device of FIG. 11.
Figure 13:
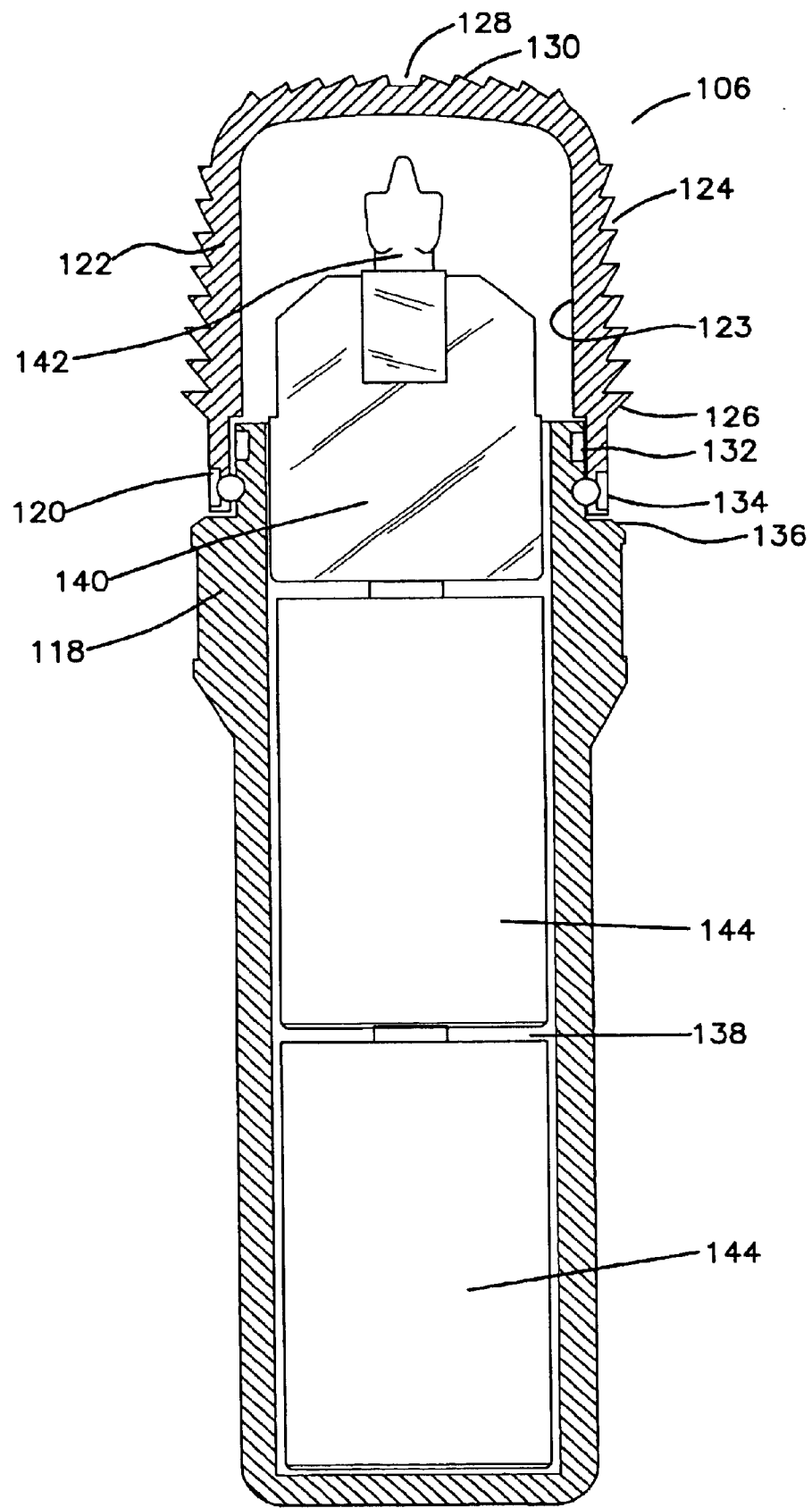
FIG. 13 is a vertical cross-sectional view of the device of FIG. 12.
Figure 16:
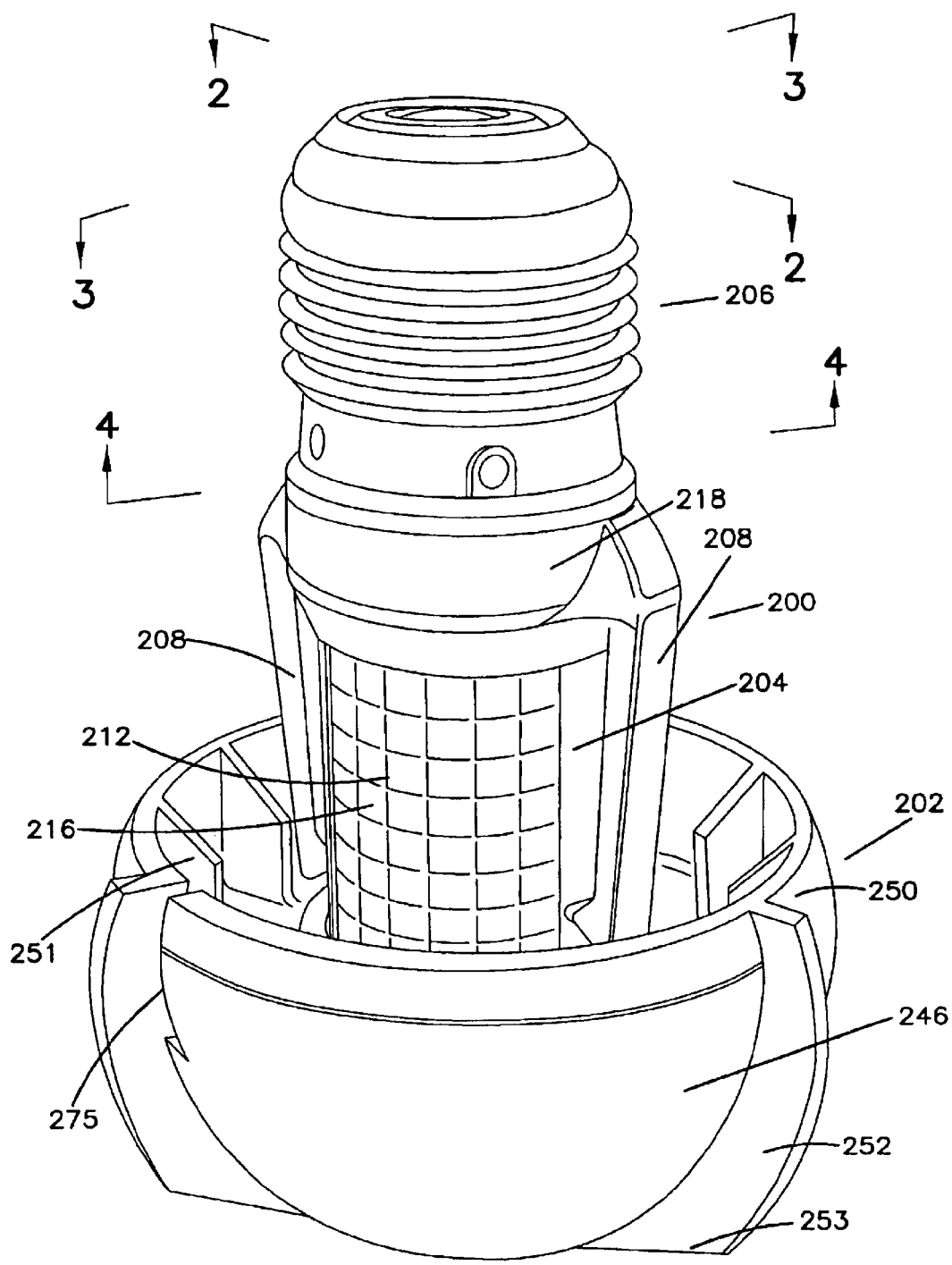
FIG. 16 is a front perspective from above of a third embodiment according to the present invention.
Figure 17:
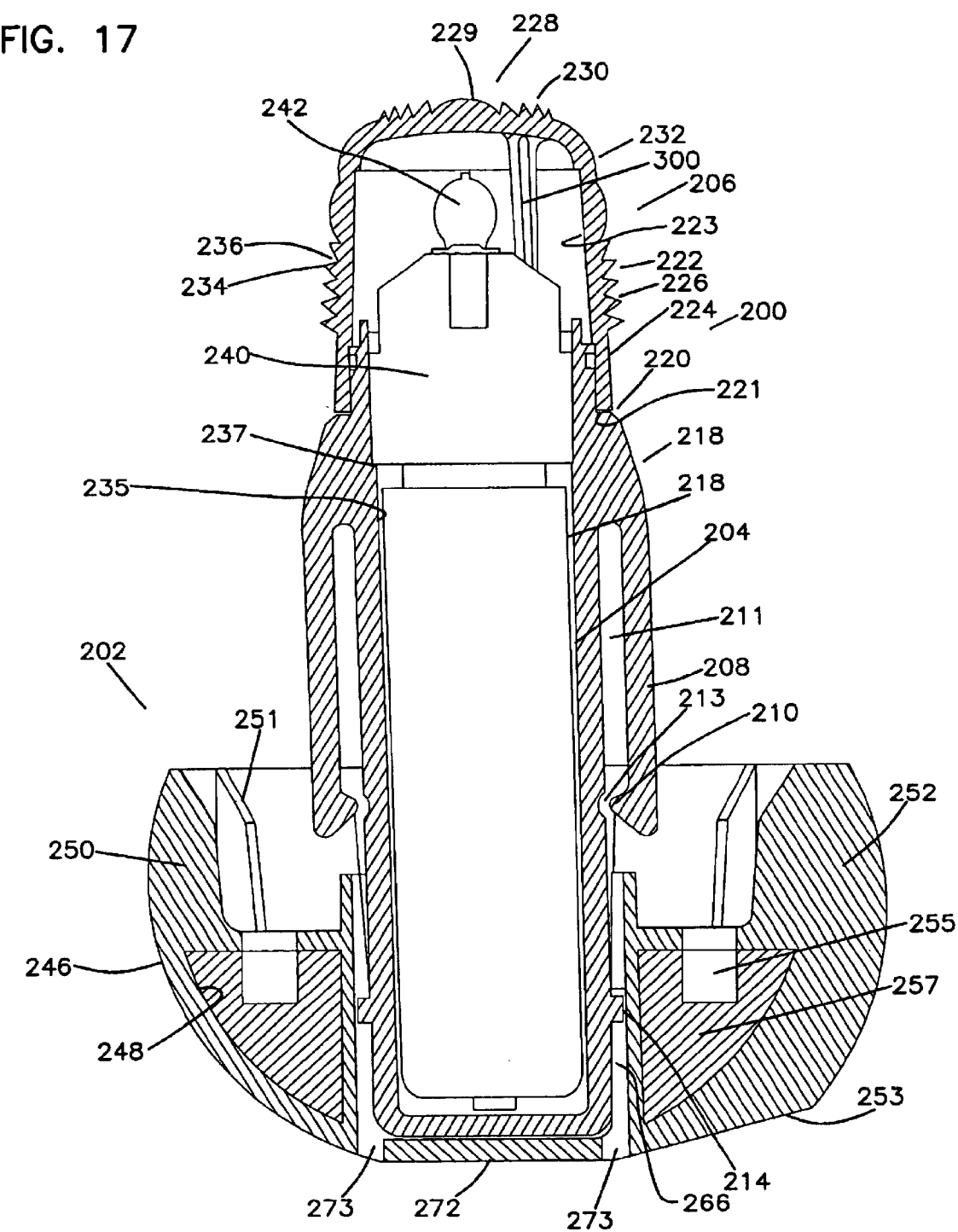
FIG. 17 is a vertical cross-section along the lines of and in the direction of arrows 2—2 of FIG. 16.
Figure 18:
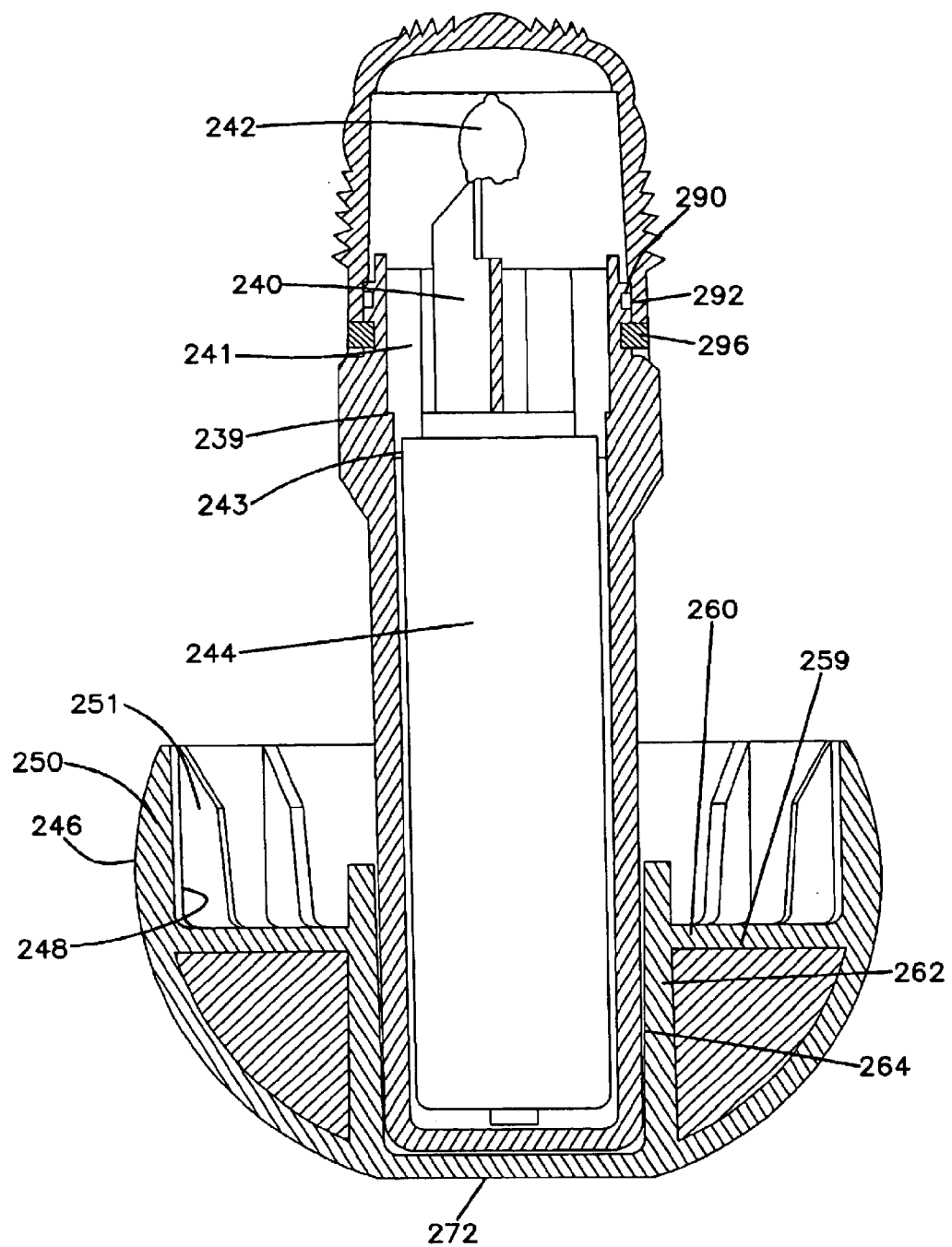
FIG. 18 is a vertical cross-section along the lines and in the direction of arrows 3—3 of FIG. 16.
Figure 21:
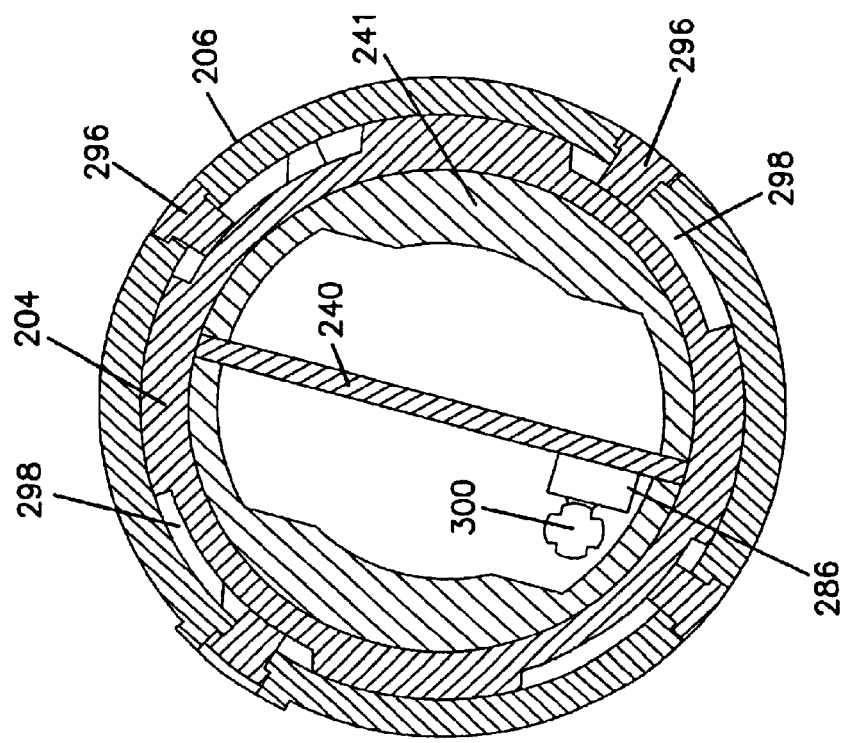
FIG. 21 is cross-sectional view along the lines and in the directions of arrows 4—4 of FIG. 16.
Figure 19:
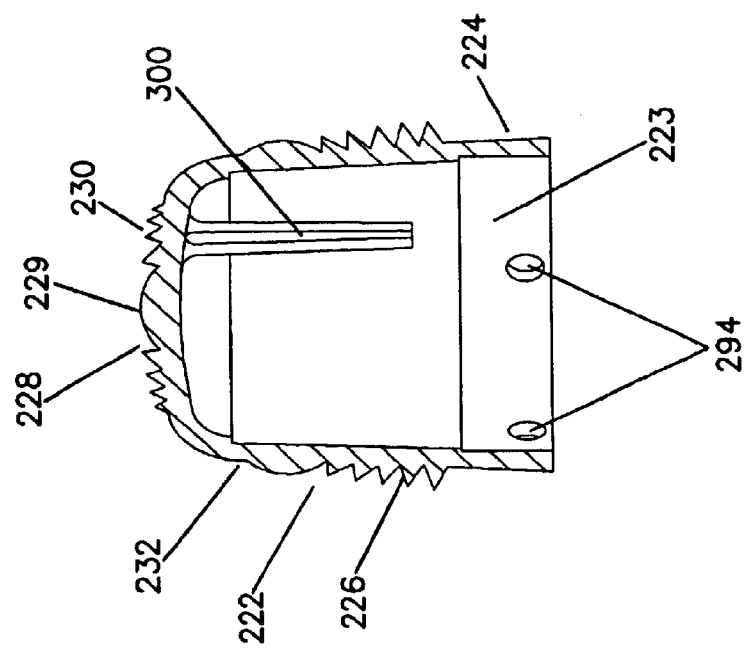
FIG. 19 is a vertical cross-sectional view of the lens of the embodiment of FIGS. 16 and 17.
Figure 20:
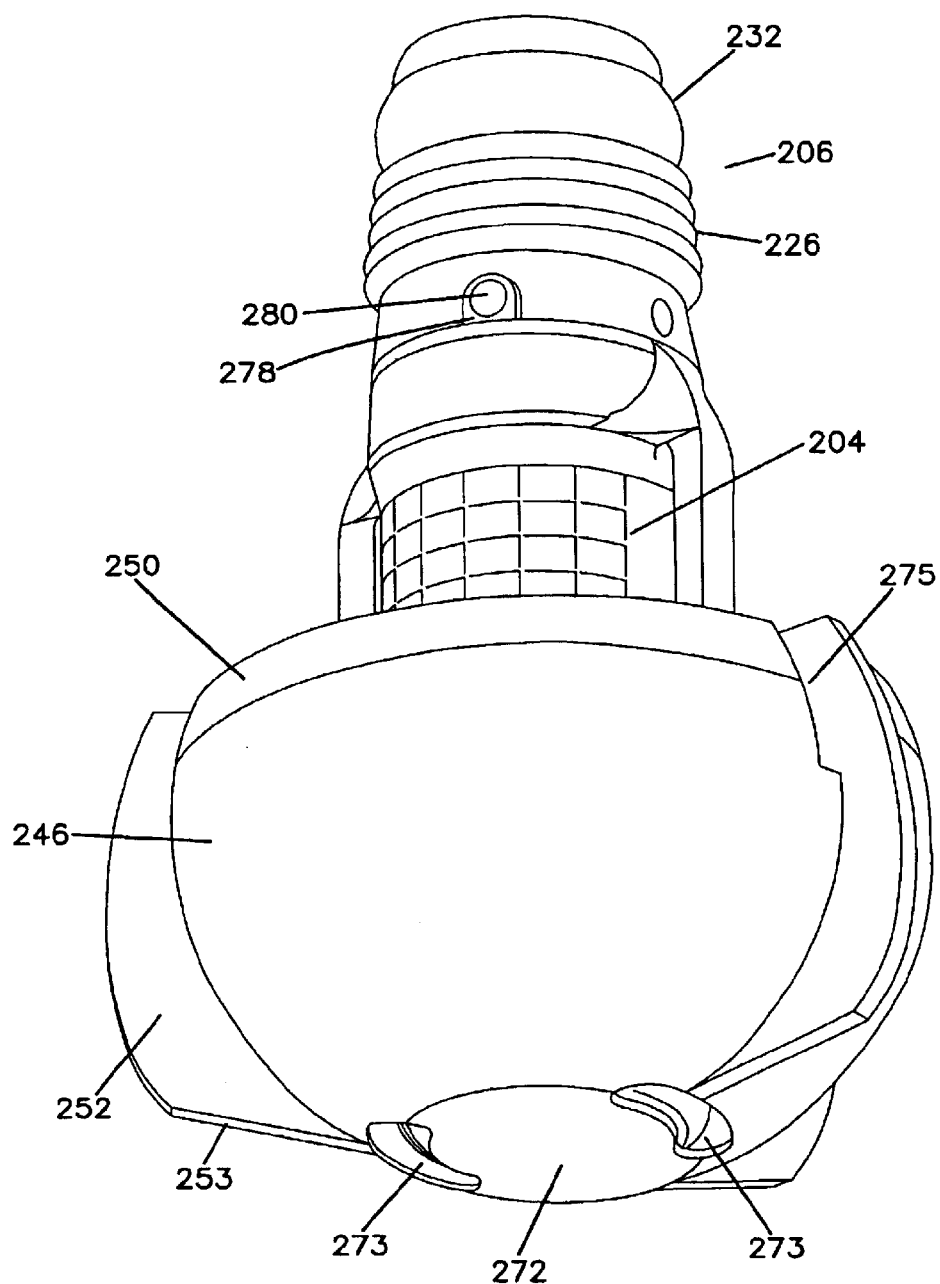
FIG. 20 is a perspective view from below of the third embodiment.

As shown in FIG. 3, the side-arms 4 are affixed to the elongated body 1 adjacent the top thereof and extend downwardly substantially parallel with sides of the elongated body 1. The inner surface of each arm 4 and the opposed surface of the elongated body 1 have small protrusions 10 which serve to hold a strap passing between the arms 4 and the elongated body 1 in a more secure manner. FIG. 10 shows a strap attached to the illustrated warning device by means of the side-arms 4.

Figure 4:
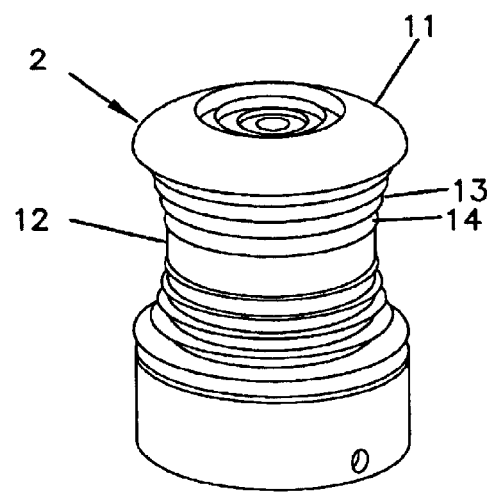
FIG. 4 is a perspective view of an illumination means suitable for use in the device of this invention.
Figure 5:
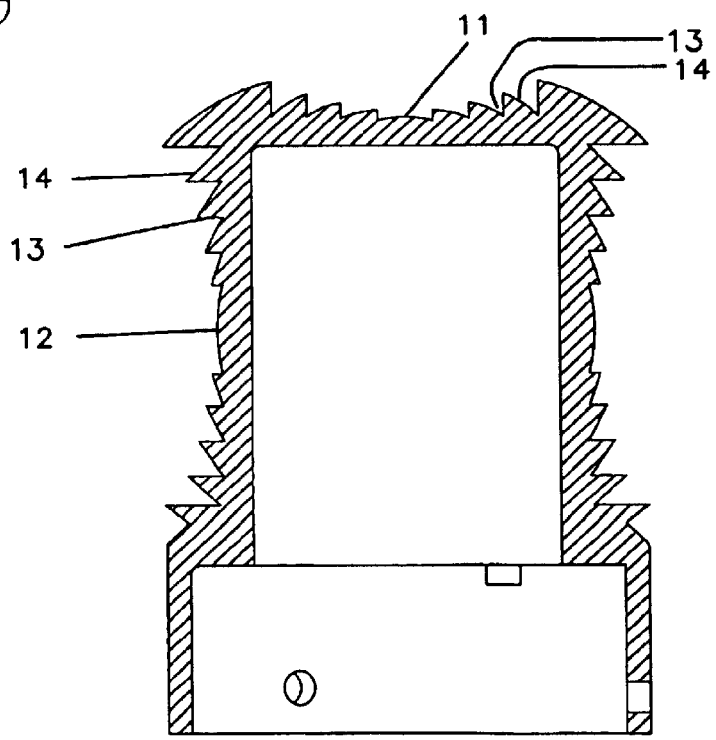
FIG. 5 is a side cross-sectional view of an illumination means suitable for use in the device of this invention.

FIGS. 4 and 5 show suitable fresnel lens structures for the illumination means of this invention. These figures show a substantially (although not entirely) cylindrical lens having a top surface 11 and a side surface 12. The side surface 12 contains a series of annular grooves 13 and ridges 14 extending about the side surface 12. The top surface 11 has a number of concentric circular grooves 13 and ridges 14.

Figure 6:
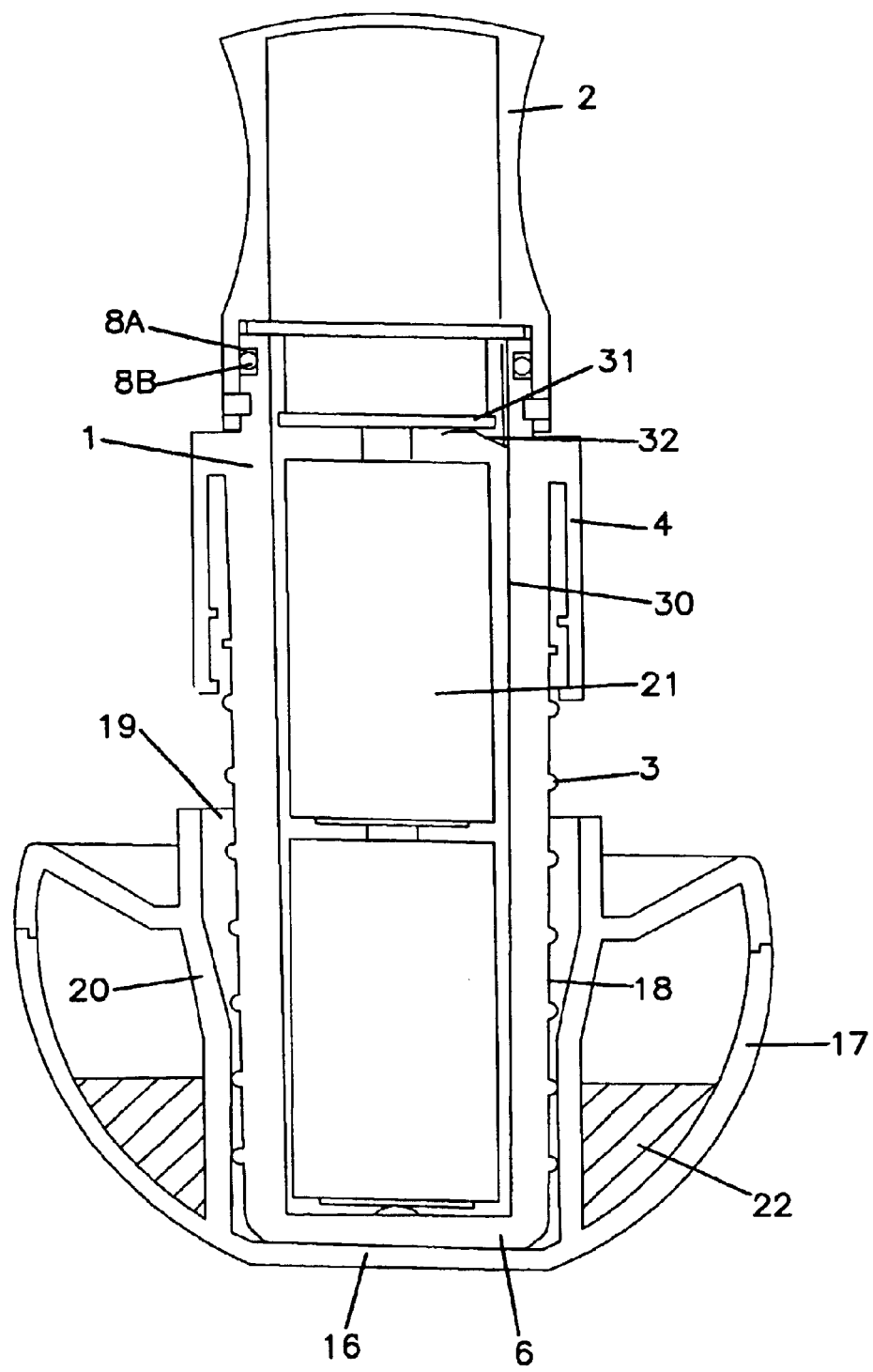
FIG. 6 is a side cross-sectional view of the device of FIG. 1 shown in engagement with a base body.

FIG. 6 shows the warning device positioned within a base body 15. FIG. 6 also shows an O-ring 8B positional within the annular groove 8A. The O-ring is incorporated to prevent ingress of flammable or destructive gases or liquids from entering into the warning device. This makes the warning device better suited for use in abnormal situations such as, for example, hazardous environments.

FIG. 6 also shows two batteries 21 located co-axially within the elongated body 1. A switch contact 30 touches one terminal of the batteries adjacent the flat base 6 of the elongated body 1. The switch contact 30 extends the length of the batteries 21 to near the top end of the elongated body 1 where a top portion 32 of the switch contact 30 contacts a printed circuit board 31. The printed circuit board 31 also contacts the other terminal of the batteries 21. The printed circuit board 31 contains electrically conductive tracks (not shown) to complete an electrical circuit thereby enabling current from the batteries 21 to pass through the globe or light emitting diode (not shown) and through the switch contact 30. The globe or light-emitting diode is mounted on the printed circuit board 31. When the device is not in operation, the top portion 32 of the switch contact 30 is in contact with an insulated portion of the circuit board. When in operation, that is after the fresnel lens 2 and the circuit board 31 (which is secured to the lens) have been rotated from a non-operational position to an operational position, the top portion 32 of the switch contact 30, contacts the conductive tracks to complete the electrical circuit. The surface of the printed circuit board 31 which contacts the top portion 32 of the switch contact 30 may be coated with an insulating varnish to prevent premature electrical leakage from the batteries 21. The varnish over the conductive tracks will be scratched away by the first rotation of the circuit board 31 relative to the top portion 32 of the switch contact 30 for electrical contact between said top portion 32 and the conductive tracks.

Figure 7:
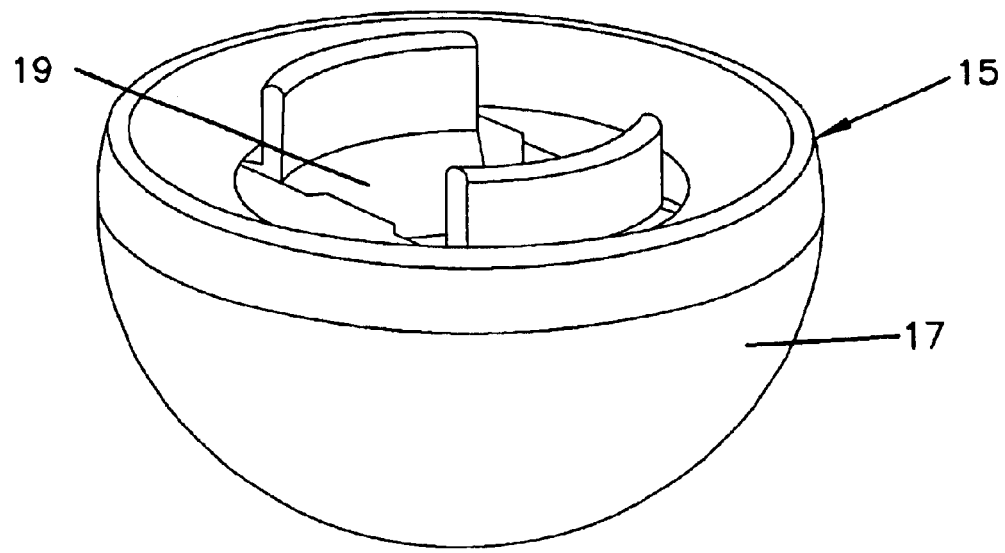
FIG. 7 is a perspective view of the base body shown, in cross-section, in FIG. 6.
Figure 8:
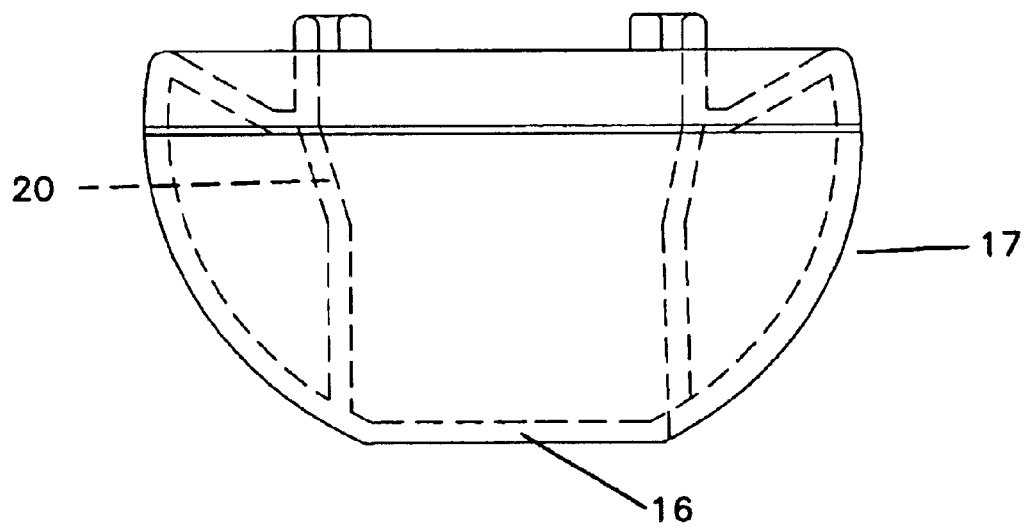
FIG. 8 is a side view of the base body of FIG. 7 showing its internal structure.

The base body 15 is more clearly shown in FIG. 7. Body 15 is substantially hemispherical in configuration. The base body 15 has a flat base section 16 and rounded side portions 17. The base body 15 has a recess 18 which extends from a hole 19 in a top portion thereof. A lower portion of the wall 20 of the recess 18 is configured so as to snuggly receive the elongated body 1. The ribs 3 press against the lower portion of the wall 20 in a resilient manner to provide the snug fit.

Suitable weighted material 22, such as cast iron or steel, is located adjacent the base section 16 of the base body 15.

Figure 9:
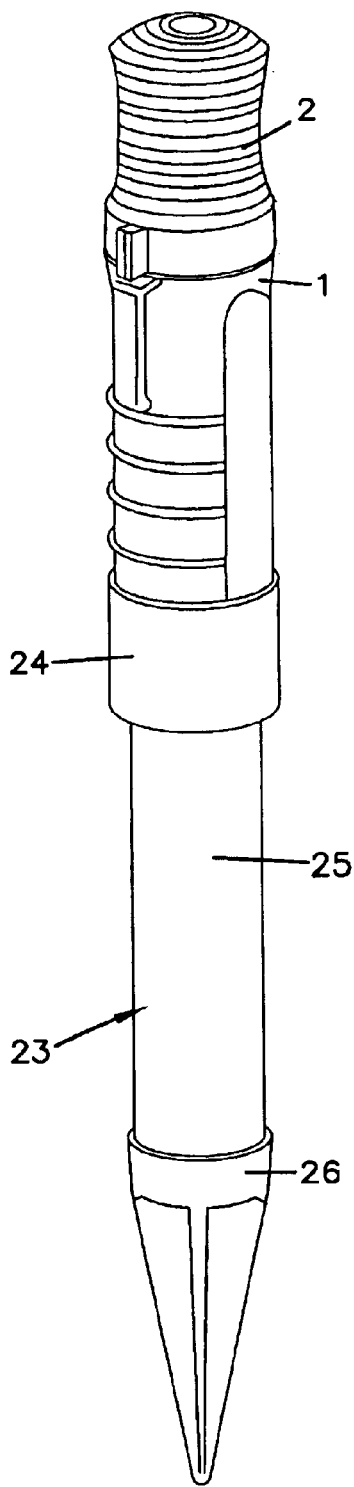
FIG. 9 is a perspective view of the device of FIG. 1 shown in engagement with a spiked member.

FIG. 9 shows the illustrated warning device engaged with a spiked member 23. The spiked member 23 includes an upper collar member 24, a central pipe section 25 and a spike end 26 distant from the collar member 24. The collar member 24 may simply be a rubber connector adapted to snuggly fit around a bottom portion of the elongated body 1. The leg section 25 may simply be a piece of standard PVC piping or any other suitable material. The spike end 26 may be a moulded or zinc die cast spike.

The fresnel lens 2 may be made of impact-resistant polycarbonate. The base body 15 is preferably made of an impact-resistant plastic of sufficient resilience and strength to allow the unit to be dropped from a reasonable height, such as 1 meter. The elongated body 1 is also preferably made of an impact resistant plastic.

The warning device of this invention can be used in a number of different ways. It may be used as a hand-held warning device, for instance, by airport personnel when guiding an aeroplane or a helicopter into a parking bay or emergency landing area. The axial rays act as a landing aid for aeroplane or helicopters landing in emergency or unscheduled situations. When used in the hand-held manner, the device can also operate as a torch as indicated above. The device may, alternatively, be placed within a base body in the situations where the device is intended to be placed upon the ground or some other similar surface and where it is desirable but it maintains an upright orientation. The configuration of the base body described herein enables the device to be unloaded from a vehicle onto the ground without any great care or precision being taken to set it in an upright position as this position will be obtained by the self-righting operation of the base body. This aspect of the invention is particularly useful in high wind situations or where the device is likely to be knocked by persons or animals in the relevant vicinity.

The device is also adapted to be fitted to a spiked member in which case it is particularly suitable for use in snow conditions where a number of the devices can be staked out to indicate the line of a roadway or boundary. Similar applications can be made of the device of this invention in flooded areas in which case the length of the spike is determined in order to be sufficient for the illumination means to appear above the water level.

The device of this invention is also adapted to be attached to a strap which can then be connected to a body such as the arm of a user, or a tree.

A second embodiment is shown in FIGS. 11 to 15. Here, there is shown as lamp member 100 and a base 102.

The lamp member 100 has an elongate body 104 with a lens 106 at the upper end thereof. Two opposed handles 108 extend radially outwardly from and axially downwardly along the body generally parallel to the longitudinal axis of the body 100. At their lower end, each handle 108 has a radially inwardly directed projection 110 which preferably contacts or almost contacts the outer surface 112 of body 104.

At its lower end body 104 has two opposed, radially outwardly extending lugs 114, the purpose of which will be described below.

Outer surface 112 of body 104 preferably has a pattern 116 embossed thereon to assist a user to grip body 104. The upper region of body 104 has a portion 118 of increased diameter due to increased wall thickness. It is from portion 118 that handles 108 extend.

Portion 118 has a stepped portion 120 adapted to receive the wall 122 of open lower end of a Fresnel lens 106. Outer surface 124 of wall 122 has peripheral wedge-shaped projections 126 arranged around the longitudinal axis of the lamp member 100. The top 128 has concentric rings 130 so the Fresnel effect is carried over from the wall 122 to the top 128. Inner surface 123 of wall is substantially flat. A seal 132 mounted in step portion 120 to provide a sealing engagement between lens 124 and body 104. Step portion 120 has a recess 136 into which a radially-inwardly extending ridge 134 on wall 122 is located to assist the location of lens 124 relative to body 104, in the axial direction.

Body 104 has a hollow interior 138 in which are located one or more dry-cell batteries 144 which, by use of appropriate connections, supply power to a circuit board 140, on which illumination means 142 is mounted. Illumination means 142 may be any form of lamp, light emitting diodes, or any number or combination thereof. Light emitting diodes are preferable if the device is to be used in situations where flammable materials may be involved.

The circuit board 140 has appropriate circuitry to control the flash rate of lamp 142 which is preferably in the range of 0.8–2.2 Hz, more preferably in the range of 1.0–2.0 Hz. An advantageous flash rate is 1.2 Hz, with a maximum variation of up to 0.2 Hz, with a flash duration of 0.2 seconds.

As shown in FIGS. 14 and 15, the base 102 has an outer member 146 and an inner member 148. The outer member 146 has a substantially hemispherical outer wall 150 to provide a "self-righting" feature to the assembled device. To reduce the tendency of the assembled device to "walk" along a paved surface, radially extending ribs 152 are provided which extend outwardly from outer wall 150. Two or more equally spaced ribs 152 are provided.

Outer member 146 has a top surface 154 with a plurality of equally-spaced, radially-extending cut-outs 156 therein adapted to receive locating fins 158 depending from upper surface 160 of inner member 148. As illustrated, there may be a large number of fins 158 and corresponding cut-outs 156. However, the number may be varied as required, if desired. For example, there may be only two accurate fins with the cut-outs being of corresponding size, number, shape and location. If there were to be four fins, there would be four cut-outs of corresponding size, shape and location. Outer member 146 also has a central sleeve 162 adapted to receive the lower end of body 104. Sleeve 162 has a cylindrical side wall 164 with two L-shaped keyways 166 therein to receive lugs 114 of body 104 in the manner of a bayonet fitting.

Inner member 148 has an upstanding peripheral wall 159 which, at its upper end, terminates with an outwardly and downwardly extending skirt 168. When assembled, fins 158 pass through cut-outs 156 until upper surface rests on top 154. Skirt 168 locates on and aligns with outer wall 150. Skirt 168 and outer wall 150 may be secured together by, for example, gluing, welding, ultrasonic welding, or any other suitable means. Similarly, the upper surface 160 and top 154 may also be secured together. A central opening 170 aligns with the sleeve 162. Outer wall 150 preferably has a relatively flat base 172 upon which the assembly can rest. By virtue of the hemispherical shape of wall 150, the base 102 will tend to return to the "vertical" position if knocked.

Like the embodiment of FIGS. 1 to 10, rotation of lens 124 about the longitudinal axis relative to body 104 activates lamp 142. Return rotation will de-activate lamp 142. By virtue of the integral nature of body 104, and the sealing between lens 124 and body 104, the assembly can be used in hazardous situations, particularly if the lamp 142 is one or more LED's.

By virtue of the bayonet fitting of lamp member 100 in base 102, lamp member 100 can be relatively easily released from base 102 and used independently thereof.

Also, by virtue of the one-piece construction of body 104, and the sealing with lens 124, the device can be used in adverse conditions and/or hazardous conditions with a substantially reduced risk of failure, fire or explosion.

To refer now to the embodiment of FIGS. 16 to 21, the embodiment is a variation of the second embodiment. Therefore, like reference numerals will be used for like components, but in place of the prefix number 1 of the second embodiment, a prefix number 2 will be used.

To refer to the drawings, there is provided a lamp member 200 and a base 202. The lamp member 200 has an elongate body 204 and a fresnel lens 206 at the upper end thereof. Extending radially outwardly from, and then parallel to the longitudinal axis of, the elongate body 204 are two diametrically opposed handles 208. At their lower end the handles 208 have a projection 210 directed towards the outer surface 212 of elongate body 204. The outer surface 212 has small dimples 213 aligned with projections to 210 so that a tortuous path is created for a belt or other device between projection 210 and outer surface 212. This enables a belt or other device to be located in the gap 211 between handles 208 and outer surface 212.

Adjacent the lower end of elongate body 204 are two radially outwardly directed and diametrically opposed lugs 214. The purpose of the lugs is to assist with engagement with the base 202, as will be understood from the following description. The outer surface 212 preferably has a pattern 216 of an embossed form to enable the outer surface 212 of elongate body 204 to be easily gripped.

The elongate body 204 has an upper portion 218 of increased diameter. It is from the upper portion 218 that handles 208 extend. At its upper end, the upper portion 218 has a stepped portion 220 of reduced diameter. The diameter of stepped portion 220 is generally similar to that applicable for elongate body 204. This creates a step 221 which is to assist with the mounting and location of lens 206. The lens 206 has a side wall 222 with an inner surface 223 and an outer surface 224. As can be seen, the inner surface 223 is generally flat and engages on the stepped portion 220 and rests on step 221. The outer surface 224 forms the fresnel lens, as will be understood from the following description.

Lens 206 has a top 228. Centrally located in top 228 is a dome portion 229 which is intended to provide a beam of light generally along the longitudinal axis of the elongate body 204 and lens 206, but generally diverging to form a cone-shaped beam with the included angle of the cone being of the order of 10°. The outer limits of the beam are 5° from the longitudinal axis. A number of projections 230 are provided around the periphery of dome portion 229. These projections are somewhat triangular in shape, and are angled towards the central axis. They diminish in height as the radius increases. This is to provide a generally filtered light through the projections 230, in accordance with fresnel design criteria.

The outer surface 224 also has a number of projections 226 similar to the projections 230 but where the height of the projection increases toward base of the lens 206. Again, this is to provide a general filtered light in accordance with fresnel lens characteristics. Between the two sets of projections 226, 230, is a relatively smooth portion 232. The portion 232 is intended to provide a second, annular beam along an angle of 5° either side of a line perpendicular to the longitudinal axis of the elongate body 204 and lens 206.

Therefore, as can be seen, there is a generally vertically and slightly divulging beam of light through dome portion 229, and a generally horizontal beam through smooth portion 232. Projections 226, 230 spread the source of the light to provide an apparent block of light, rather than a point source. The vertical beam through dome portion 229 may be used in a number of ways. For example, it may be used to provide visible marking for use in laying out aircraft landing zones, for all forms of aircraft. This will be applicable to fixed wing, and helicopter applications. Another possible application is for use in marking-out the location of underwater object. It can also be used when the device is being hand-held when directing traffic such as around accidence, at accident locations, and so forth. The beam through the smooth portion 232 provides a strong beam of light when the device is being used as, for example, a warning beam around an accidence scene, and so forth. It is also appropriate when the device is being used to mark-out runways, and other landing strips. The projections 230, 226 preferably comprise a number of ridges 234 and recesses 236.

The elongate body 204 has an internally hollow interior 238. Located within interior are batteries 244 used to be the source of power. A circuit board 240 housing all of the necessary control of circuitry is located within the interior 238. Mounted on the circuit board 240 is a globe or other light source 242. It is preferable that the globe 242 be located such that the lamp filament is at the optical centre of lens 206.

The circuit board 240 is mounted on a grommet 241. The grommet 241 is preferably of a polycarbonate material and is located in the interior 238 of elongate body 204 such that a step 239 in grommet locates on a step 237 on the interior wall 235 of body 204. In this way, the grommet is accurately located. It also prevents axial movement of the grommet 241 below that required. It is preferred that the grommet 241 be secured in place relative to the elongate body 204 by any suitable means such as, for example, fastening, gluing, or ultrasonic welding.

Batteries 244 supply the power to the circuit board 241 and thus the globe 242 by appropriate connectors (not shown). In the embodiment shown, the batteries are located with the positive towards the base of the elongate body 204. Testing has shown that with current technology alkaline batteries, the positive should be at the bottom to assist in reducing the incidence of internal cell rupture during periods of high loading. Preferably, an impact—absorbing washer is located beneath batteries 244 to prevent the batteries 244 from contacting the base of elongate body 204, and to provide significant energy absorption during a base impact. If the batteries 244 comprise a number of batteries axially aligned, a washer should be inserted between the various batteries to further reduce the energy transferred from one battery to another during impact. Preferably, those washers (not shown) are made of an energy absorbing material such as natural rubber or the like. They do not need a great thickness, with thickness of such as three millimetres being adequate. A hardness 70 would be of in a preferred range. Naturally, any such washers must be of annular nature to allow for the terminals of the batteries.

Preferably, the grommet 241 has a further step 243 so as to positively locate, and restrain, against radial and axial movement, the batteries 244, and to prevent damage to circuit board 240 by batteries 244.

The upper portion 218 of elongate body 204 has a peripheral groove 290 in which is located an O-ring 292, or other suitable seal. Preferably, the groove 290 is a rectangle groove and the dimensions of the O-ring 292 and groove 290 are selected to maintain a water-tight seal between the inner surface 223 of lens 206, and the body 204. It is preferred that the seal be such that pressures of up to, for example, 800 psi can be withstood. It is preferable that the O-ring 290 be provided with an appropriate lubricant such as, for example, a silicon grease, to allow rotation movement of lens 206 relative to body 204 about the longitudinal axis of body 204 and lens 206, as will be understood from the following description. At its lower end, the lens 206 has a plurality of circumferentially located holes 294 therethrough. In each of these holes 290 is located a pin 296. The pins 296 extend radially through the lens 206, and beyond the lens 206 and locate in arcuate slots 298 in body 204. The pins 296 are preferably secured in the holes 294, such as, for example, by being threadingly engaged therewith, glued, or ultrasonically welded. By having this construction, the length of the arcuate slots 298 provides end limits for the rotation of lens 206 relative to body 204 about the longitudinal axis.

Extending axially downwardly from top 228 is an activating pin 230. The length of pin 230 is such that it at least in part overlaps with the circuit board 240. Located on circuit board 240 is an on/off switch 286. Therefore, rotation of lens 206 relative to body 204 about the longitudinal axis will cause activating pin 300 to rotate until it contacts the switch 286 on circuit board 240 to thus activate the circuitry on circuit board 240, with the power being supplied by batteries 244, to illuminate the globe 242. Rotation in the opposite direction will release the switch to de-activate the globe 242.

In accordance with the early embodiment, the illumination of globe 242 may be continuous, or it may be controlled by a control facility on circuit board 240 to provide for flashing of the globe 242, in accordance with the earlier embodiments.

It is preferred that the activating pin 300 be made of a polycarbonate so that it has some resilience. When operating the switch 286, the resilience of pin 300 will allow for a certain amount of over-travel when the lens 206 is rotated relative to the body 204 to operate the switch 286. This reduces the need for close tolerances in the switching system, and the resilience will allow for tolerances without damaging the switch 286 or the circuit board 240.

The lens 206 is preferably made of a polycarbonate material and may be made in any number of suitable ways. It may be clear, or may have any suitable dye, such as, for example, red, amber, blue, green, or any combination of any of these.

To now consider the base 202, it has an outer wall 246 and an inner wall 248. It is generally hemispherical in shape, but has a flat base 272. Extending outwardly from outer wall 246 are a number of ribs 252. The ribs 252 will act to tend to prevent the device from "walking" when self-righting on a flat surface. Preferably, three such ribs 252 are located, equally spaced around outer wall 246. Preferably, the base 253 of ribs 252 are chamfered to an angle of approximately 5° to the horizontal so as to improve the self-righting capability of the base 202.

An upper surface 260 is provided. The outer wall 246 extends beyond the upper surface 260 and thus above the centre of gravity of base 202 to assist the self-righting feature if the lens 206 is touching the surface upon which base 202 is to be located. This, therefore, provides an upwardly extending rim 250. To provide for strength in rim 250, a number of upper strengthening ribs 251 extending between inner wall 248 and upper surface 260 are provided.

Extending around the periphery of flat base 272 are a number, preferably two, arcuate openings 273. The openings 273 are to assist in the draining of water or other fluid which may be caught in base 202, particularly above upper surface 260. In addition, a vertically extending opening 275 in rim 250 may be provided to also assist in such drainage.

A centrally located sleeve 262 is provided having a side wall 264. An L-shaped keyways 266 is provided. Preferably, opening 273 are aligned with keyways 266. The lugs 214 locate in the keyways 266 (there being one on each side of side board 264) and thus assist in retaining the lamp 200 in base 202. Preferably, at the junction of the L in the keyways 266, an indent is provided projecting into the keyways 266 so that during the insertion and twisting of lamp 200 into the base 202, the lugs 214 must pass the indent (not shown) to thus assist in retaining the lamp 200 in base 202. This minimises the chances of the lamp 200 separating from the base 202 during impact. Between sleeve 262, upper surface 260, and inner wall 248, a void 259 is created. Located within void 259 is a weight 257 to provide for weighing to assist in the self-righting feature. Preferably, the weight is a die-cast zinc-alloy insert. Preferably, this alloy uses 4% aluminium and 96% zinc. It may be over-moulded with a rubber modified polypropylene to provide a resilient, external coating.

The insert 257 in the void 259 has a number of depressions 255 in its upper surface which are required to hold the inert 257 in the correct position within the dye when injection moulding the base 202. They serve no other purpose.

Preferably, the lens 206 has a lug 278 with a circular depression 280 therein. The lug 278 co-operates with mark on the body 204 so that an assembly operator will be aware of the correct rotation of the lens 206 relative to body 204 when assembling the two.

The above description of the invention is given by way of illustration and is not intended in any way to limit the scope of the invention. It will be apparent to persons skilled in the art that the scope and/or application of the invention is not restricted to the preferred embodiments of the invention described herein.

What we claim is:

1. A hazard/safety warning device including;
   a) a lamp member having an elongate body;
   b) illumination means including a lens, the lens having a side wall and a top, the lens being adapted to provide a first beam along the longitudinal axis of the lens, and an annular second beam perpendicular to the longitudinal axis of the lens located at one end of the elongate body; and
   c) engagement means on the body, distance from the illumination means, adapted to securely, yet releasably, engage a centrally located recess in a supporting means for supporting the device in a desired orientation;
   d) the lamp member being capable of operation independently of the supporting means; and
   e) the lens having an activating pin integral with and extending axially of the lens;
   wherein the lens is adapted to be rotated relative to the elongate body about the longitudinal axis of the lens to enable the activating pin to contact an on/off switch, and to enable the disengaging of the activating pin from the on/off switch.

2. A hazard/safety warning device as claimed in claim 1, wherein the top of the lens has a central domed portion so as to provide the first beam; and the side wall has a smooth portion to provide the second beam; the domed portion and the smooth portion being separated by an annular ring of projections, there being provided a band of second projections beneath the smooth portion.

3. A hazard/safety warning device as claimed in claim 2, wherein the projections are of generally triangular configuration with the annular ring of projections being oriented towards the longitudinal axis, and the band of second projections being oriented generally in the radial direction.

4. A hazard/safety warning device as claimed in claim 1, wherein the lens has a lower periphery, there being plurality of equally-spaced openings through the lower periphery; each opening having a pin located therein and extending therethrough so as to engage in arcuate slots in the elongate body.

5. A hazard/safety warning device as claimed in claim 1, wherein the illumination means includes a light emitting diode mounted on a printed circuit board, the printed circuit board being mounted in the elongate body.

6. A hazard/safety warning device as claimed in claim 5, wherein the printed circuit board is mounted on a grommet which is adapted to be located within the elongate body, the grommet having adjacent its lower end a stepped portion adapted to locate on a stepped portion of the elongate body.

7. A hazard/safety warning device as claimed in claim 6, wherein the grommet includes a further step portion adapted to locate and secure a battery pack located within the elongate body.

8. A hazard/safety warning device as claimed in claim 1, wherein the supporting means includes a substantially hemispherical base which can be located on the surface to be substantially self-righting so as to maintain the substantial upright warning device and wherein the substantially hemispherical base has an upper surface, there being provided a centrally-located sleeve depending from the upper surface to an outer wall of the hemispherical space so as to provide the centrally located recess.

9. A hazard/safety warning device as claimed in claim 8, wherein the substantially hemispherical base extends upwardly beyond the upper surface to provide a rim, the rim having a plurality reinforcing ribs on an inner surface thereof extending for substantially the full height thereof.

10. A hazard/safety warning device as claimed in claim 9, wherein a void is formed between the upper surface, the sleeve and the outer wall, the void being substantially filled with an insert; the insert being of a material of sufficient weight to assist the self-righting of the base.

11. A hazard/safety warning device as claimed in claim 9, wherein the sleeve has two dimensionally opposed L-shaped keyways so as to provide a bayonet fitting; the engagement means on the body including diametrically opposed lugs projecting radially outwardly from the body and being adapted to locate in the keyways.

12. A hazard/safety warning device as claimed in claim 5, wherein the light emitting diode is located at the optical center of the lens.

13. A hazard/safety warning device as claimed in claim 8, wherein the outer wall has a plurality of radially outwardly extending ribs, each rib having a lower end which is chamfered.

14. A hazard/safety warning device as claimed in claim 8, wherein the substantially hemispherical base has a centrally-located, substantially flat lower surface, there being at least one opening in the flat surface, and at least one opening in the rim.

15. A hazard/safety warning device as claimed in claim 1, wherein the elongate body has an upper portion, there being provided two diametrically opposed handles extending radially outwardly and axially downwardly from the upper portion, each handle having a lower end with each lower end having a radially inwardly directed projection; the elongate body having two dimples, there being a dimple radially aligned with each projection.

* * * * *